United States Patent [19]

Corso et al.

[11] 3,762,721

[45] Oct. 2, 1973

[54] CARTRIDGE LOCKING MECHANISM

[75] Inventors: Vincent A. Corso, Medinah; Donald J. Dattilo, Mt. Prospect, both of Ill.

[73] Assignee: Motorola, Inc., Franklin Park, Ill.

[22] Filed: Feb. 8, 1971

[21] Appl. No.: 113,215

[52] U.S. Cl. .......... 274/4 B, 179/100.2 Z

[51] Int. Cl. .......... G11b 5/78

[58] Field of Search .......... 274/4 B, 4 F, 4 G

[56] References Cited

UNITED STATES PATENTS

| | | | |
|---|---|---|---|
| 3,578,338 | 5/1971 | Ueno | 274/4 B |
| 3,486,675 | 12/1969 | Krechman | 247/4 G |
| 3,603,596 | 1971 | Fash | 274/4 B |

FOREIGN PATENTS OR APPLICATIONS

| | | | |
|---|---|---|---|
| 3,226,869 | 0/1967 | Japan | 274/4 B |

*Primary Examiner*—Louis R. Prince
*Assistant Examiner*—A. J. Mirabito
*Attorney*—Vincent Rauner and R. J. La Porte

[57] ABSTRACT

A cartridge locking mechanism for a tape player having a tunnel for receiving a tape cartridge, comprises a pivotally mounted arm having a projection extending into the tunnel in the path of a cartridge received therein. A torsion spring mounted for rotational and torsional movement adjacent the tunnel includes a first end extending outwardly therefrom for engagement with the actuator arm. The second end of the spring extends outwardly toward the cartridge receiving tunnel and includes a roller for receipt in a groove in a side wall of the cartridge. When inserted into the tunnel, the cartridge engages the projection, causing the actuator arm to rotate. Rotation of the arm in turn rotates the torsion spring, thereby to move the roller into the tunnel in engagement with the cartridge in the groove therein. Full insertion of the cartridge into the tunnel "twists" the torsion spring, providing a force at the roller directed against the tape cartridge to maintain the latter secured in the tunnel.

12 Claims, 4 Drawing Figures

INVENTORS
VINCENT A. CORSO
DONALD J. DATTILO
BY Ronald J. LaPorte
ATTY.

CARTRIDGE LOCKING MECHANISM

BACKGROUND OF THE INVENTION

This invention relates generally to a cartridge type tape player including a locking mechanism for securing a cartridge therein and more particularly to a cartridge locking mechanism for use in a tape player adapted to receive a cartridge having a notch or recess formed along an edge thereof.

It is desirable in a tape player wherein cartridges are inserted for play back to include means for firmly positioning the cartridge in the player against apparatus for driving the tape through the cartridge and for playing the tape.

In the past, many of the mechanisms for securing tape cartridges in tape players have been complex in design and operation, and/or expensive to produce.

SUMMARY OF THE INVENTION

Accordingly, it is a primary object of the present invention to provide in a cartridge type tape player, a new and improved locking mechanism for removably securing a cartridge in the player in the play position.

It is another object of the invention to provide a mechanism in a cartridge type tape player for removably securing therein a cartridge having a notch or recess formed along an edge thereof.

It is still another object of the present invention to provide cartridge locking apparatus of the type described heretofore, which is relatively simple in design, effective in operation and inexpensive to fabricate.

Briefly, a preferred embodiment of the cartridge locking mechanism according to the invention comprises a pivotally mounted arm member having a projection extending therefrom into the cartridge receiving tunnel of a tape player in the path of a cartridge received therein. A torsion spring is mounted along a side wall of the chassis of the player adjacent the tunnel and extends in the direction of movement of the cartridge. The torsion spring, which is rotatable axially, includes a first end portion extending outwardly therefrom for engagement with the pivotally mounted arm member. The opposite or second end of the torsion spring extends outwardly in a direction opposite from that of the first end toward the tunnel, and includes a roller or the like member thereon.

Upon insertion of a cartridge into the tunnel, the cartridge engages the projection causing the arm member to be pivoted. The pivotally moving arm member engages the first end of the torsion spring, rotating the latter. The rotation of the torsion spring moves the second end thereof toward the tunnel and the edge of the moving cartridge, so that the roller engages the cartridge and is ultimately received in the notch formed therein. Continued insertion of the cartridge to its fully inserted position causes a torsional twisting of the spring to in turn provide a force at the roller directed against the cartridge to secure the latter in the tunnel in engagement with the tape driving and playing instrumentalities.

Removal of the cartridge from the tunnel forces the roller out of the notch and eventually out of the path of the cartridge. The last-mentioned movement of the roller releases the torsional force against the cartridge and causes rotation of the torsion spring, so that the first end of the spring engages the pivotal arm member and returns it to its normal position.

DETAILED DESCRIPTION

Figures 3, 4:
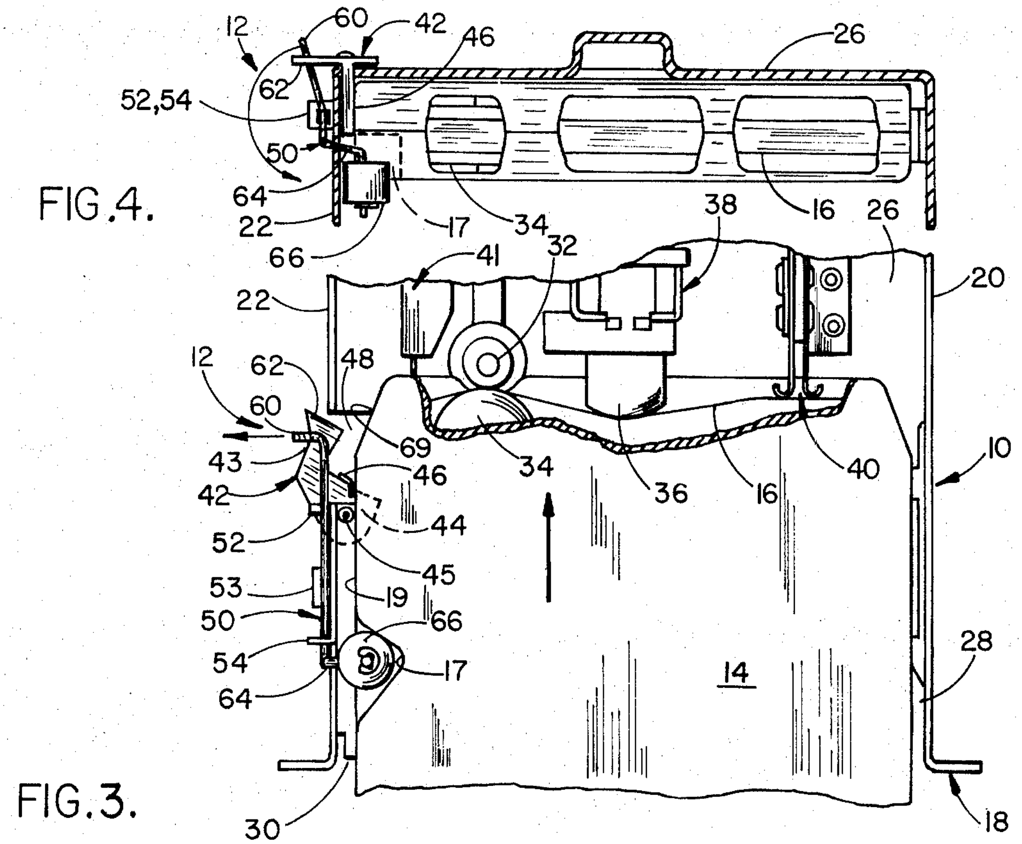
FIG. 3 is a bottom sectional plan view of the tape player of FIG. 1 illustrating the cartridge locking mechanism in its operated condition.
FIG. 4 is an end view of the tape player of FIG. 3 as seen looking toward the leading edge of the cartridge inserted thereinto.
Figures 1, 2:
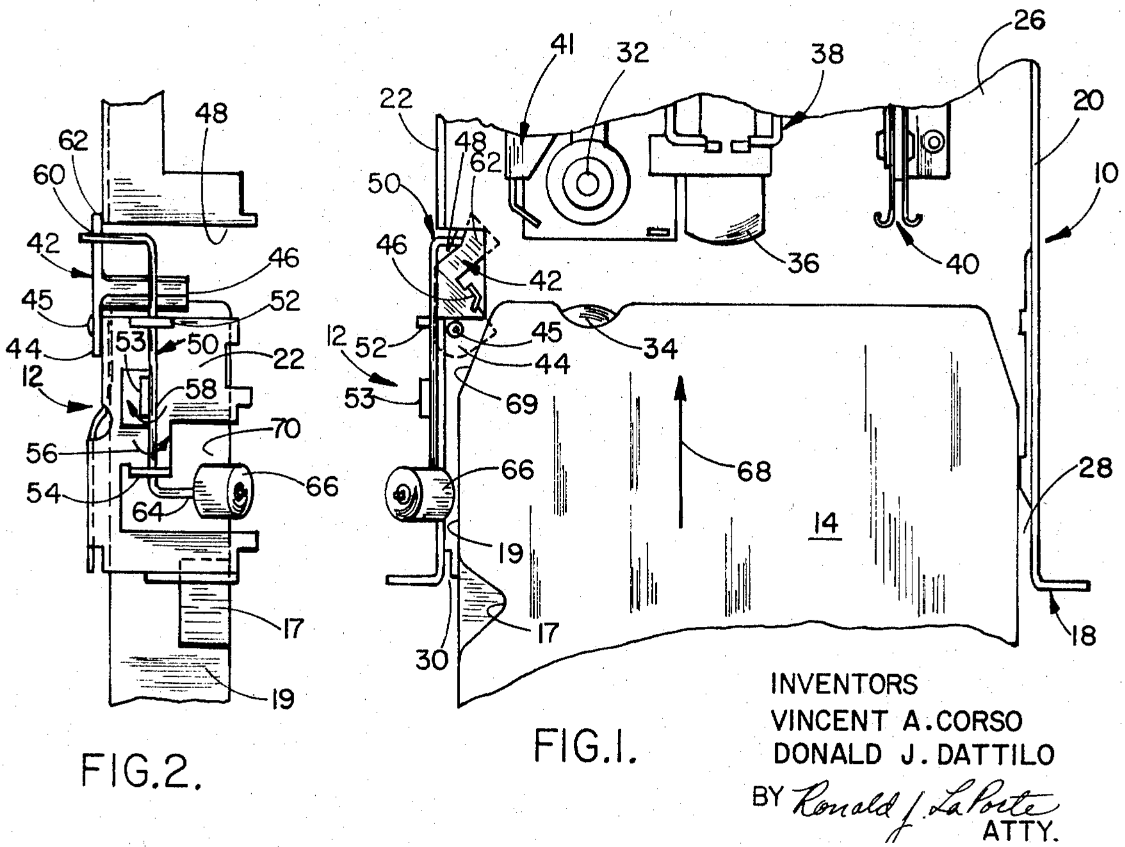
FIG. 1 is a bottom sectional plan view of a cartridge type tape player incorporating a cartridge locking mechanism according to the invention.
FIG. 2 is a side sectional view of the tape player of FIG. 1 illustrating in greater detail the elements of the cartridge locking mechanism according to the invention.

Referring now to the drawing in greater detail wherein like numerals have been employed to designate similar parts throughout the various views, there is illustrated in FIGS. 1 and 3 a cartridge type tape player 10 in which a cartridge locking mechanism 12 according to the invention is employed.

The tape player 10 is adapted to receive and play a tape cartridge 14 of the conventional type, having a recorded, multi-track tape 16 (FIG. 3) mounted therein and a notch or groove 17 formed along a side wall 19 thereof.

The tape player 10 includes a chassis 18 having a pair of side walls 20, 22 interconnected by a bottom wall 26 to form a cavity or tunnel 28 having an open end 30 through which the cartridge 14 is received therein. Mounted on chassis 18, in communication with the tunnel 28, is a capstan shaft 32 against which a pressure roller 34 mounted in the tape cartridge and over which the tape 16 passes, is pressed upon insertion of the cartridge into tunnel 28 (see FIG. 3). The capstan shaft is driven in the usual manner by a motor and pulley arrangement (not shown) to move the tape 16, sandwiched between the capstan shaft and pressure roller, through cartridge 14 past the magnetic tape head 36 also mounted on chassis 18 in communication with tunnel 28.

The magnetic tape head 36 is mounted on chassis 18 by means of a mounting bracket assembly 38, designed to move the tape head in a plane adjacent the tape 16 in a direction transverse the movement of the tape for the purpose of selectively playing certain ones of the various tracks on the tape. Apparatus (not shown) is also provided in tape player 10 to automatically position the magnetic tape head with respect to the various tape tracks in response to the detection by contact set 40 mounted on bottom wall 26 of chassis 18, of a conductive strip (not shown) on the magnetic tape.

A tape guide 41, also mounted on chassis 18 is provided to insure the alignment of tape 16 with tape head 36 as the tape passes adjacent the latter.

The cartridge locking mechanism 12 according to the invention is mounted on side wall 22 of the chassis of the tape player 10, adjacent the notched or grooved side wall 19 of the cartridge received in tunnel 28. The locking mechanism 12 includes an arm member 42 pivotally mounted at a first end 44 by means of a suitable fastener, such as, for example rivet 45 (FIG. 1), to bottom wall 26 of chassis 18. A projection 46 extends outwardly from arm 42 through an aperture 48 formed in the side and bottom walls 22, 26, respectively, into tunnel 28 in the path of a cartridge 14 received therein.

A torsion spring 50 is mounted on suitable spaced brackets 52, 53, 54, along the outer surface of wall 22 of a the chassis 18, generally in the direction of insertion of a cartridge in tunnel 28. The torsion spring is rotatable in the directions of arrows 56, 58 (FIG. 2) in accordance with the insertion and withdrawal, respectively, of a cartridge 14 into tunnel 28. A first end 60 of torsion spring 50 extends outwardly at substantially right angles therefrom into aperture 48 for engagement with free end 62 of pivotal arm 42. Arm 42 includes a notch 43 formed therein to ensure proper mating with end 60 of the torsion spring. The other end 64 of torsion spring 50 extends outwardly therefrom in a direction substantially opposite the direction of extension of end 60 thereof. The last mentioned end 64 is also bent to accommodate a roller 66, which as will be explained hereinafter engages side wall 19 of cartridge 14 as the latter is inserted into tunnel 28. The roller 66 is received in groove 17 in the last mentioned cartridge wall to maintain the cartridge secured in tunnel 28 while playing tape 16.

Upon insertion of cartridge 14 into the open end 30 of tunnel 28 in the direction of arrow 68 as illustrated in FIG. 1, projection 46 of arm 42 is engaged by the beveled portion 69 of side wall 19 of the cartridge. The movement of cartridge 14 against projection 46 causes arm 42 to be pivoted about point 45 so that end 62 of arm 42 engages end 60 of torsion spring 50. Movement of the last mentioned end 60 rotates torsion spring in brackets 52, 53, 54, in the direction of arrow 56 (FIG. 2), causing roller 66 mounted on end 64 of the torsion spring, to be moved through aperture 70 in wall 22 into rolling engagement with side wall 19 of cartridge 14 and eventually is received in groove 17.

Continued movement of cartridge 14 into the fully inserted position in tunnel 28 causes arm 42 to be moved against end 60 of torsion spring 50 with sufficient force to cause a torsional twisting of the spring. The torsional twisting in turn provides a resultant force at roller 66 directed toward the side wall 19 of cartridge 14, to secure the cartridge in its fully inserted position in tunnel 28. The force provided at roller 66 against cartridge 14 is sufficient to maintain the cartridge in a tape player even under the severest conditions.

Withdrawal of cartridge 14 from tunnel 28 forces roller 66 out of groove 17, causing the torsional force provided by torsion spring 50 to be released and the torsion spring to be rotated in the direction of arrow 58 (FIG. 2). The rotation of spring 50 moves end 60 thereof against end 62 of pivotal arm 42, moving it about pivot point 45 so that projection 46 once again is moved through aperture 48 and into tunnel 28. Roller 66 is eventually moved substantially out of the path of cartridge 14 and the latter is free to be withdrawn completely from tunnel 28.

After the cartridge 14 is removed from player 10, the cartridge locking mechanism is returned to its normal position, ready to be operated by the insertion of another cartridge into tunnel 28.

Thus the cartridge locking mechanism 12 according to the invention provides a relatively simple arrangement for securing tape cartridges in tape players of the general type described. The 'ocking mechanism while being effective to maintain a tape cartridge in the play position in a tape player, is also relatively inexpensive to manufacture.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. A tape player for playing a tape cartridge having an endless recording tape mounted for movement therethrough and including a groove formed in a wall thereof, said player including a tunnel for receiving said cartridge, means engageable with said tape for driving the latter through said cartridge when said cartridge is inserted fully into said tunnel, a magnetic tape head also engageable with said tape when said cartridge is in the fully inserted position, and a cartridge locking mechanism for removably securing said cartridge in said tunnel in the fully inserted position, said mechanism comprising: a torsion spring member mounted for axial rotation on said player adjacent said tunnel, said spring member being rotatable in a first direction upon insertion of said cartridge into said tunnel and rotatable in the opposite direction upon withdrawal of said cartridge from said tunnel, means mounted for cooperation with a first end of said spring member, extending into said tunnel for engagement with a cartridge inserted thereinto, said means being movable in response to the engagement with a cartridge inserted into said tunnel to rotate said spring member in said first direction, said spring member including cartridge retaining means for receipt in said groove in said cartridge wall in response to the insertion of said cartridge into said tunnel, said spring member being twisted torsionally in response to the full insertion of said cartridge into said tunnel to provide a resultant force through said retaining means directed against said cartridge to maintain the latter in said tunnel.

2. A tape player as claimed in claim 1 wherein said cartridge retaining means is released from engagement with said cartridge upon withdrawing the latter from said tunnel.

3. A tape player as claimed in claim 2 wherein said cartridge retaining means includes a roller mounted on the second end of said torsion spring member for engagement with a side wall of said cartridge upon insertion of said cartridge into said tunnel.

4. A tape player as claimed in claim 1 wherein said cartridge engaging means includes an arm member mounted for pivotal movement on said tape player and including a projection extending into said tunnel into the path of said cartridge for engagement therewith, said arm member also engageable with said torsion spring to cause rotation thereof in said first direction upon insertion of said cartridge into said tunnel in engagement with said projection, said arm member providing a force against said torsion spring sufficient to cause torsional twisting thereof upon insertion of said cartridge to a fully inserted position in said tunnel, thereby to maintain said cartridge in position in said tunnel.

5. A cartridge locking mechanism for use in a tape player having an open-ended tunnel for receiving a tape cartridge and instrumentalities for driving and playing the recording tape in said cartridge upon the insertion of the cartridge into said tunnel, said cartridge locking mechanism comprising: a pivotally mounted arm member having a projection extending therefrom into said tunnel in the path of a cartridge received therein, a torsion spring mounted alongside said tunnel for axial rotation, a first end of said torsion spring extending outwardly therefrom for engagement by said pivotal arm member, and the other end of said torsion spring extending outwardly therefrom toward said tunnel, said last-mentioned end including means for engaging said cartridge to secure the latter within said tunnel, said engaging means being positioned outside of said tunnel until insertion of a cartridge into said tunnel, to in turn move said arm member into engagement with the first end of said spring thereby to cause the latter to be rotated, the rotational movement of said torsion spring moving said engaging means into said tunnel for engagement with said cartridge.

6. A cartridge locking mechanism for use in a tape player having an open-ended tunnel for receiving a tape cartridge, and instrumentalities for driving and playing the recording tape in said cartridge upon the insertion of the cartridge fully into said tunnel, said cartridge locking mechanism comprising: a pivotally mounted arm member having a portion extending into said tunnel in the path of a cartridge received therein, a torsion spring mounted adjacent said tunnel for rotational movement in first and second opposite directions, a first end of said torsion spring extending outwardly therefrom for engagement with said arm member and the second end of said torsion spring extending outwardly therefrom in a direction different than said first end, and including means thereon for engaging said cartridge, said arm member being moved pivotally to engage the first end of said torsion spring upon partial insertion of said cartridge into said tunnel, said arm member being pivoted in response thereto to rotate said torsion spring in said first direction, thereby to move said cartridge engaging means into said tunnel and into engagement with said cartridge, said torsion spring being twisted torsionally upon fully inserting said cartridge into said tunnel, thereby to cause said cartridge engaging means to be urged against said cartridge with a predetermined force.

7. A cartridge locking mechanism as claimed in claim 6 wherein said cartridge includes an indentation formed in a side wall thereof for receipt of said cartridge engaging means therein and wherein said cartridge engaging means includes a roller mounted for rolling engagement with said wall of said cartridge and for receipt in said indentation therein.

8. A cartridge locking mechanism as claimed in claim 7 wherein upon withdrawal of said cartridge from said tunnel said roller is released from engagement with said cartridge and is removed from said indentation, causing said torsion spring to be rotated in said second direction to return said arm member to its original position.

9. A tape player for playing a tape cartridge including a notch formed along an edge thereof and in which there is an endless recording tape mounted for movement therethrough, said player including a tunnel for receiving said cartridge, means engageable with said tape for driving the latter through said cartridge when said cartridge is inserted fully into said tunnel, a magnetic tape head also engageable with said tape when said cartridge is in the fully inserted position, and a locking mechanism for removably securing said cartridge in said fully inserted position in said tunnel, whereby said tape is maintained in engagement with said driving means and said tape head, said locking mechanism comprising: a pivotally mounted arm member having a portion extending therefrom into said tunnel in the path of said cartridge, a torsion spring mounted for axial rotation, a first end of said spring extending outwardly therefrom in a first direction for engagement by said pivotal arm member, and the other end of said spring extending outwardly in a direction different than said first end and including thereon a roller for receipt in the notch in the cartridge upon the latter being inserted into the tunnel in said player, said roller member normally positioned substantially outside of said tunnel, out of the path of said cartridge, the portion of said arm member extending into said tunnel being engaged by said cartridge upon partial insertion of the latter into said tunnel, whereby said arm member engages the first end of said torsion spring to rotate the latter, causing said roller to extend into said tunnel in egagement with said cartridge in said notch, and upon full insertion of said cartridge into said tunnel, said torsion spring being twisted torsionally to provide a retaining force at said roller directed against said cartridge.

10. A tape player for playing a tape cartridge including an enclosed housing having a plurality of interconnecting walls, one of said walls having a V-shaped notch therein, said cartridge including a recording tape mounted for movement through said housing, said tape player comprising: a tunnel having an open end for receiving a cartridge therein, means engageable with said tape for driving the tape through said cartridge when the latter is in said tunnel and urged against the driving means, a magnetic tape head also engageable with said tape when said cartridge is in the inserted position in said tunnel, and a cartridge locking mechanism for releasably securing said tape cartridge in said tunnel to maintain the tape in engagement with said driving means and said tape head, said locking mechanism including: a pivotally mounted arm member having a projection at a free end thereof extending into said tunnel in the path of said cartridge, a torsion spring mounted for axial rotation and torsional movement, a first end of said spring extending outwardly in a first direction with respect thereto for engagement with said arm member, and the other end of said torsion spring extending outwardly toward said tunnel and including a roller mounted thereon for receipt in the V-shaped notch in the cartridge housing wall, said roller member normally being positioned substantially outside of said tunnel out of the path of said cartridge, and being moved into said tunnel for engagement with the wall of said cartridge including said notch upon said cartridge being inserted partially into said tunnel and the roller member being received ultimately in said notch in said cartridge wall, said torsion spring being twisted torsionally to provide a predetermined force through said roller against said cartridge upon fully inserting said cartridge in said tunnel.

11. A tape player as claimed in claim 10 wherein removal of said cartridge from said tunnel forces said roller out of said notch to in turn rotate said torsion spring, whereby said first outwardly extending end thereof returns said arm member to its initial position.

12. A tape player for playing a tape cartridge having an endless recording tape mounted for movement therethrough and including a groove formed in a wall thereof, said player including a tunnel for receiving said cartridge, means engageable with said tape for driving the latter through said cartridge when said cartridge is inserted fully into said tunnel, a magnetic tape head also engageable with said tape when said cartridge is in the fully inserted position, and a cartridge locking mechanism for removably securing said cartridge in said tunnel in the fully inserted position, said mechanism comprising: a torsion spring member mounted on said player adjacent said tunnel, said spring member including cartridge retaining means for receipt in said groove in said cartridge wall upon insertion of said cartridge into said tunnel, means mounted for cooperation with one end of said spring member, extending into said tunnel for engagement with a cartridge inserted thereinto, said means being movable in response to the engagement with a cartridge inserted into said tunnel to rotate the spring member in a first direction, whereby said cartridge retaining means is urged into said tunnel toward said cartridge wall, said torsion spring member being twisted torsionally to provide a force through said retaining means directed against said cartridge to maintain the latter in said tunnel in response to the insertion of said cartridge to a fully inserted position in said tunnel.

* * * * *